Patented Apr. 3, 1934

1,953,144

UNITED STATES PATENT OFFICE 1,953,144

CHEMICAL TREATMENT OF CLAYS

William S. Wilson, Roslindale, Mass., assignor to Merrimac Chemical Co., Inc., Boston, Mass., a corporation of Massachusetts No Drawing. Application July 16, 1930, Serial No. 468,465

4 Claims. (Cl. 23—123)

This invention relates to the recovery of valuable constituents present in clays such, for example, as alumina, and it has particular application to the treatment of clays and manufacture of aluminum sulfate (alum), aluminum chloride and surrogate for fuller's earth.

Heretofore, clay has been utilized as a source of alumina in the manufacture of alum. Briefly stated, these processes involve reducing the clay to a pulverant form and by calcination rendering the alumina, acid soluble. Subsequently, the pulverized calcined clay is treated with sulphuric acid in a suitable kettle or vat. During its early stages and while the acid is concentrated, the reaction is vigorous and generates large amounts of heat. As the reaction proceeds, the rate diminishes until during its final stages heat is generally applied to complete the reaction insofar as possible. Even with the application of heat, however, it is impossible from a practical standpoint to recover more than 85%–90% of the available alumina.

After the acid extraction is thus completed, the resulting mixture is allowed to settle for the purpose of separating the finely divided silica which remains undissolved. Because of the fact that the clay undergoing treatment is in a large measure in a very finely divided state, the silica residue is likewise finely divided and settles very slowly, particularly if the alum solution is concentrated. Thus, even after many hours the layer of clear solution constitutes only a small fraction of the total. The clear layer is withdrawn and the remaining portion washed repeatedly to recover the soluble sulphates.

Actual tests have indicated that the residue resulting from treating one ton of calcined clay according to the prior method, after settling for 25 hours, holds 5110 pounds of liquor. Each of the washings with the same settling time will result in residue containing proportionately the same amount of liquor. This results in a very slow process in which it is necessary to handle an enormous quantity of liquor, taking perhaps a week to complete the washing and settling operations.

After the liquor according to the prior process is recovered, the water must be evaporated to produce the alum. As illustrative of the costly nature of this process, it has been found that the solution cannot be settled or filtered if it contains more than 30% of the sulphate, due to the viscosity of a more concentrated solution. Commercial alum contains about 56½% of aluminum sulphate, and therefore it is evident that in any process of producing this substance involving settling or filtering of the solution no less than a ton of water must be evaporated for each ton of commercial alum produced.

From these observations, it is apparent that a commercial installation capable of producing a comparatively small output of alum would necessitate enormous equipment, the cost of installation and maintenance of which would render the process prohibitive.

One object of this invention is to provide a method for treating and manipulating clays whereby the valuble constituents therein may be removed or otherwise isolated in a merchantable form without incurring the disadvantages incident to the prior practice, particularly as regards the separation of the acid soluble constituents from the insoluble residue.

A further object of this invention is to afford a process for the recovery of alumina from clays which may be practiced conveniently by means of standard metallurgical equipment and which does not involve a filtering operation, such as characterizes prior processes.

The invention likewise contemplates a procedure by which clay is rendered acid soluble while in a permanent lump or fragment form and which may be treated to remove the acid soluble portion without the formation of any substantial amount of difficultly separable insoluble matter.

I have found that if one selects a clay of relatively hard and strong physical structure that does not crumble with handling and retains its physical form under reasonable pressure, such clay may be reduced to fragment size either before or after calcination, and subsequently subjected to acid extraction by relatively countercurrent movement of the clay with respect to the acid to obtain uniformly high yields of a substantially clear solution of alum. I have likewise found that the clay may be calcined successfully in lump or fragment form, and further, that the acid is capable of penetrating the interior of such fragments to dissolve out the acid soluble constituents, and that prior practice of intimate subdivision before calcination and particularly followed by settling and filtering operations may be obviated.

The process enjoys the advantage over prior practice in that a counter-current operation enables one not only to extract substantially all of the acid soluble constituents from the calcined clay, but enables one to obtain an aluminum sulphate wherein a substantial amount of the alumina is present in its basic form. It is accordingly possible to remove the alumina from the clay by means of an amount of acid which is substantially less than corresponds to that present in ordinary aluminum sulphate. In an analogous manner, if one employs acid other than sulphuric, as for example, hydrochloric, it is possible to obtain aluminum chloride wherein a substantial amount of the aluminum is present in the form of basic aluminum chloride. Thus one may obtain without difficulty solutions of aluminum chloride wherein one third of the total $Al_2O_3$ is present as basic $Al_2O_3$.

For the purpose of this invention one may employ clays such, for example, as flint clays, these being particularly strong and capable of sustaining many times their own weight without failing, even in the presence of an aqueous medium and after calcination. Other clays may be employed satisfactorily. In general, any clays which are capable of sustaining a reasonable amount of pressure in an aqueous medium without forming into a sticky mass that will disperse or suspend in finely divided form in the solution may be employed. This requirement excludes soft plastic clays which are commonly employed in the ceramic industry and which crumble when compressed in one's hand or which tend to become plastic or form a sludge when subjected to a liquid treatment.

I prefer to employ flint clays which, though not as abundant as soft clays, are widely distributed and easily available, these being comparatively hard, and may be rendered of plastic consistency, if at all, only after considerable working. It is noteworthy in this connection that the objectionable properties of this class of clay when used in the ceramic arts have been found to be distinctly advantageous for the purpose of this invention. Thus for example, whereas clays which are suitable for the ceramic art are relatively soft, easily dispersed in water, readily pulverized and capable of forming plastic, moldable composition with but little working, for the purpose of this invention the fact that the material can be reduced to fragments which are not dispersed in the presence of an acid solution and which sustain their own weight and retain their physical form, particularly after calcination and in the presence of an acid medium, is a distinct advantage.

In general, my process consists in reducing the clay to a size which is easily handled during the subsequent calcination and extraction. Thereafter, in order to render the alumina acid soluble, the clay is roasted or calcined at a temperature of 650–850° C. or even higher. The time of exposure will vary according to the nature of the clay, the temperature employed, the size and shape of the particles, as well as other factors. After calcination, the product is placed in a vat through which an acid solution is permitted to flow. The calcined clay may be treated with solutions containing progressively increased amounts of free acid which is allowed to flow in a counter-current direction with respect to the fresh calcined clay. In this manner one is enabled to react a weak acid solution with the easily soluble alumina to obtain a final solution containing practically no free acid. On the other hand, by treating the clay which is practically exhausted with a solution which is relatively strongly acid the more difficultly acid soluble alumina is extracted. Thus the rate of dissolution is rendered uniform, the heat of reaction is conserved, the tendency to disintegrate with decrepitation is obviated, and the clarity of the final solution is insured. After the acid extraction is completed, the residue, which is essentially a skeleton of silica, remains and is washed with water to remove the soluble matter. The resulting siliceous product will be found to be of a porous nature which is slightly more fragile than the product before acid treatment, exhibits marked absorptive properties similar to that evidenced by fuller's earth, and is otherwise suited as a surrogate therefor.

The alum solution so obtained is evaporated to dryness and the product is usable in this form as technical alum. Prior to the evaporation, one should adjust the alkalinity or acidity by adding amounts of acid or alumina to obtain the desired final product.

In the event a purer product is desired than is obtainable by direct evaporation, the solution may first be treated in an appropriate manner for the removal of such objectionable impurities which may be present and which may include salts of potassium, iron, magnesium, et al. It has been observed that when calcined clays containing substantial amounts of potassium are treated with sulphuric acid in the manufacture of alum, the potassium forms a complex alum which is insoluble and is otherwise objectionable for the reason that it necessitates a filtering operation, as well as reduces the yield of the desired product. Generally speaking, it is less expensive to avail oneself of clays which are relatively free of undesirable impurities than to undertake the separation of impurities from the product. Frequently, in order to remove insoluble impurities, it is necessary to dilute the alum solution before filtering the suspended matter. Inasmuch as the filtered solution must thereafter be evaporated, the costs incident to the filtration and evaporation will amount to a substantial proportion of the total cost of the product.

In general it may be stated that potassium remains in solution as long as the solution is acidic. However, the potassium will separate out as a complex basic alum when the solution becomes only slightly basic, and the rate of precipitation will be found to increase as basicity of the solution is increased. Such precipitate is easily separated by filtration. Obviously, if the solution is maintained acidic, the potassium will remain in solution, and if the use to be made of the alum is such that the presence of potassium is not objectionable, the separation by filtration need not be undertaken.

The treatment of clay prior to the calcination will vary according to the specific procedure adopted. Thus, the procedure may involve calcining the clay in relatively large pieces and thereafter in order to facilitate rapid dissolution of the alumina in the acid, reduce the size of the lumps, or as an alternative, one may reduce the clay prior to calcination to the size which is suited for immediate acid treatment. In either case, it is desirable that the clay be relatively free of any substantial accumulation of finely divided particles, such as are commonly produced by self abrasion or rubbing of the fragments. Moreover, clay deposits consist frequently of a relatively hard rock-like form of clay which is associated with adhering plastic or finely divided particles of clay, the latter being objectionable since they become suspended in the acid and can be separated only with difficulty. For this purpose an ordinary water washing operation has been found satisfactory, particularly when the clay is wet or, if dry and the particles are not caked, the clay particles are removed by a blast of air. Some deposits of clay, particularly of the flint clays are uniform and uncontaminated by finely divided matter and, therefore, require no washing.

Ordinarily, the clay is calcined in fragment form by means of a rotary kiln and thereafter the resulting product is used directly in the acid treatment. This procedure permits of rapid uniform calcination by means of a metallurgical furnace which requires but little manual labor. On the other hand, some clays when reduced to a fragment size which is immediately suited for acid extraction disintegrate or become pulverant by reason of self abrasion during the passage through the rotary kiln, particularly if the clay is not as hard as ordinary flint clay. Under the circumstances, the amount of pulverulent clay which adheres to the fragments may be sufficient, when suspended in the acid solution, to result in objectionable amounts of insoluble residue. To obviate such objectionable manifestations, one may advantageously wash the calcined clay fragments or expose them to a strong air blast in order to free them of any dust. As an alternative, one may perform the calcination in a stationary furnace. Because of the fact that the tendency to disintegrate in the rotary kiln is reduced by employing fragments of large size, one may pass the clay in lump form through the kiln and subsequently disintegrate the lumps to the desired fragment size. In such case, however, the time of travel through the kiln must be prolonged. Moreover, particularly when the lumps are of non-uniform size the extent of calcination will be found to vary, resulting in only partial extraction of alumina.

Having obtained a calcined clay of suitable fragment size, the alumina is extracted by means of an acid such, for example, hydrochloric, sulphuric, etc., depending upon the salt form in which the aluminum is desired. Because of the fact that the initial reaction is very rapid and accompanied by the generation of a substantial amount of heat, there is a tendency for the fragments to undergo disintegration with a decrepitation which in turn results in the formation of a difficulty filterable suspension. To overcome this tendency, one may add an acid solution to the freshly calcined clay which is of low acid concentration and thereafter progressively increase the concentration of the acid as the amount of alumina present in the clay decreases. These precautions may be observed conveniently and without disadvantage by causing the materials to move in directions counter-current with respect to each other. One such procedure which may be employed advantageously is described in my copending application referred to hereinabove. Briefly, this consists in causing a solution to flow in a counter direction through a plurality of vats containing calcined clay, each successive vat containing a clay richer in available alumina content. After the desired degree of extraction is attained, the residue is washed with water and thereafter made usable as a surrogate for fuller's earth or any other purpose where a pure grade of finely divided silica is desired.

I have found that one may advantageously employ impure acids since many impurities, particularly those of a solid or colloidal nature are absorbed by the silica. Thus, for example, sludge acid which is badly off color and contains little if any commercially recoverable value, may be employed to produce an alum solution which contains less than ten percent of the carbonaceous organic matter present in the sludge acid. One may recover the silica residue on which there is absorbed the sludge acid impurities by the usual methods for revivifying absorbent materials. To this end one may heat the silica in the presence of air to a temperature of 700–1400° F. whereby the organic matter is oxidized, leaving the silica mass which may be used repeatedly as an absorbent. The fact that the material is in lump form commends it for use in connection with purification processes which involve flowing the material over the surface of the absorbent in the absence of agitating means which would otherwise be necessary if the material were of finely divided particle size.

The resulting solution of alum produced in this manner may be recovered and/or refined in any well known manner.

One method of practicing the invention is hereinafter set forth. Flint clay having a high alumina content and which is known to contain relatively small amounts of combined $K_2O$, preferably not in excess of 1%, is reduced by means of crushing machines to fragments or chips whose particle size is relatively uniform and preferably does not exceed one half inch in diameter. For this purpose a gyratory crusher which discharges into a Williams mill suitably adjusted to produce the fragment size will be found to give satisfactory results. In the event the crushed product contains a large proportion of fines, these may be removed conveniently by means of an air blast or water washing operation. The resulting product is then passed through a rotary kiln wherein it is exposed to a gas temperature of 650–850° C. for a period of from 20–60 minutes. The kiln treatment will be found to dispel the combined water and render the alumina, acid soluble. Upon cooling, the calcined clay is charged into vats, constructed of acid resisting material, which are interconnected by acid resisting conduits and are adapted to discharge their solid contents through the base.

A solution of relatively low acid concentration and relatively high in alumina salt content that has been received from a vat containing clay having a relatively smaller amount of available alumina is introduced from the bottom and permitted to overflow into the next succeeding vat which is richer in available alumina than that preceding, substantially as described in my aforementioned application. After the available alumina is removed by means of acid of progressively increased concentration, the exhausted silica residue is washed with water and discharged and thereafter the cycle is repeated by introducing freshly calcined clay.

After the alum solution contains no unreacted acid, it is evaporated until it attains the desired amount of moisture and thereafter ground and packed for shipment. In the event the solution contains undesirable impurities such, for example, as colored ferric salts, these may be eliminated or destroyed in the usual manner, as by means of a reducing agent. Suspended matter when present can be removed conveniently by filtration. For this purpose it is necessarily generally in order to prevent solidification to dilute the alum solution prior to the filtering operation, after which the excess water in the filtrate is evaporated in the usual manner. Since the cost of filtration and evaporation in a process of this character represents a substantial proportion of the total cost of the product, it is desirable that the presence of foreign matter in the alum solution be obviated as much as possible. To this end careful selection of raw materials with the view of avoiding potassium and the presence of finely divided suspended matter is important since the presence of suspended matter in the product is accounted for in at least two ways, one being the "fines" which are produced during the crushing operation, and the other, the formation of the complex potassium alum precipitate previously mentioned.

In lieu of the commercial sulphuric acid specified in the foregoing example, one may substitute sludge acid which has previously been freed of most of its tar constituents and which may contain 20–35% sulphuric acid. Unless such sludge acid is highly contaminated, the alum product obtained therefrom will be found to be remarkably pure and free of practically all of the carbonaceous matter. Such carbonaceous, tarry matter is absorbed by the silica residue, which residue functions as an absorbent during the alumina extraction. If it is necessary to remove the carbonaceous matter which remains, the alum is roasted in the presence of air whereby the carbonaceous matter is oxidized, leaving a pure aluminum sulphate. Any insoluble residue can be removed conveniently by dissolving the roasted product, filtering the solution and finally evaporating the filtered solution.

From the foregoing description, it should be apparent to those skilled in the art that the present invention affords a method for manufacturing alum or other aluminum salt compositions from clay which avoids the necessity of long and tedious settling and filtering problems, and at the same time enables one to obtain a high grade product even though the raw materials employed are distinctly inferior to those now commonly utilized for this purpose. Although the principles of this invention have been set forth more specifically in connection with the manufacture of alum (aluminum sulphate), it is not so limited and contemplates broadly the manufacture of aluminum salt compositions by reducing or crushing clay to a suitable fragment size while avoiding the presence of fines which would otherwise result in a difficultly separable suspension of insoluble matter in the alum, calcining such clay either before or after crushing to render the alumina, acid soluble, and finally extracting the alumina with an acid or acidic reagent.

What I claim is:

1. The method of extracting alumina which consists in calcining natural clay fragments having a hard rock-like texture that is not readily dispersed in an aqueous medium and substantially free of ground particles, subsequently treating such calcined clay with an aqueous inorganic acid contaminated with colloidal or finely divided carbonaceous impurities whereby the alumina present therein is dissolved by the mineral acid while the colloidal or finely divided impurities present in the mineral acid are adsorbed by the silica residue of the clay fragments and thereafter separating the resulting aqueous aluminum salt solution from the silica residue.

2. The method of treating clays of the flint clay specie which comprises calcining to incipient fusion natural fragments of such clay, subsequently treating the same with aqueous sulfuric acid recovered from petroleum acid sludge which acid is contaminated with carbonaceous impurities whereby the alumina is dissolved, forming aluminum sulfate, and the carbonaceous impurities are adsorbed simultaneously in the silica residue of the clay fragments, and thereafter separating the resulting aqueous alumina salt solution from the silica residue.

3. The method as defined in claim 2 and further characterized in that the resulting aluminum sulfate solution is withdrawn and evaporated and thereafter the product is exposed to oxidizing influences at elevated temperature to destroy odor-imparting impurities present therein.

4. The silicious residue of sludge acid extracted calcined flint clay fragments having absorbed thereon carbonaceous impurities from sludge acid.

WILLIAM S. WILSON.